United States Patent [19]

Hempleman

[11] Patent Number: 5,199,784
[45] Date of Patent: Apr. 6, 1993

[54] MOISTURE SHEDDING LIQUID COOLED FLOODLIGHT FIXTURE

[76] Inventor: Charles R. Hempleman, 511 W. Glenoaks Blvd. #633, Glendale, Calif. 91202

[21] Appl. No.: 596,719

[22] Filed: Oct. 12, 1990

[51] Int. Cl.⁵ ............................................. F21V 29/00
[52] U.S. Cl. .................................. 362/294; 362/373; 362/805
[58] Field of Search ............... 362/294, 373, 805; 165/913, 104-133, 151

[56] References Cited

U.S. PATENT DOCUMENTS

| | | | |
|---|---|---|---|
| 1,457,646 | 6/1923 | Wilson | 362/294 |
| 3,112,890 | 12/1963 | Snelling | 362/373 |
| 3,193,001 | 7/1964 | Meckler | 362/294 |
| 3,219,810 | 11/1965 | Hickman | 362/294 |
| 3,313,123 | 4/1967 | Ware | 165/913 |
| 3,624,380 | 11/1971 | Davis | 362/294 |
| 3,846,072 | 11/1974 | Patterson | 362/373 |
| 3,868,605 | 3/1975 | Davis | 362/264 |
| 4,411,516 | 10/1983 | Adachi et al. | 362/373 X |
| 4,642,742 | 2/1987 | deVos et al. | 362/269 |
| 4,772,990 | 9/1988 | Linehan et al. | 362/183 |
| 4,937,717 | 6/1990 | Betzvog, Jr. | 362/294 |

*Primary Examiner*—Richard R. Cole

[57] ABSTRACT

A series of compact, interchangeable, sloping heat exchangers (22), (48), (54), and (58) which when combined with various floodlight fixtures eliminate radiated heat from the floodlight fixture, in combination with drip accumulators (44) which collect condensed water from the atmosphere that collects on the cooling surfaces of heat exchangers (22), (48), (54) and (58). Drip accumulator nozzles (46) discharge the condensed water to a desired location and prevent water damage from occurring to vulnerable floodlight fixture components.

8 Claims, 4 Drawing Sheets

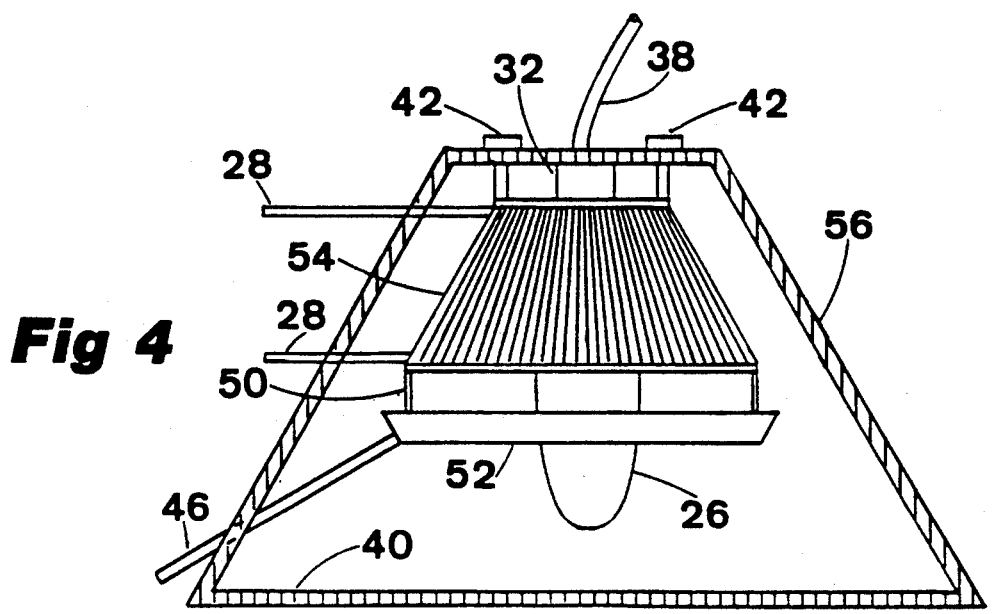
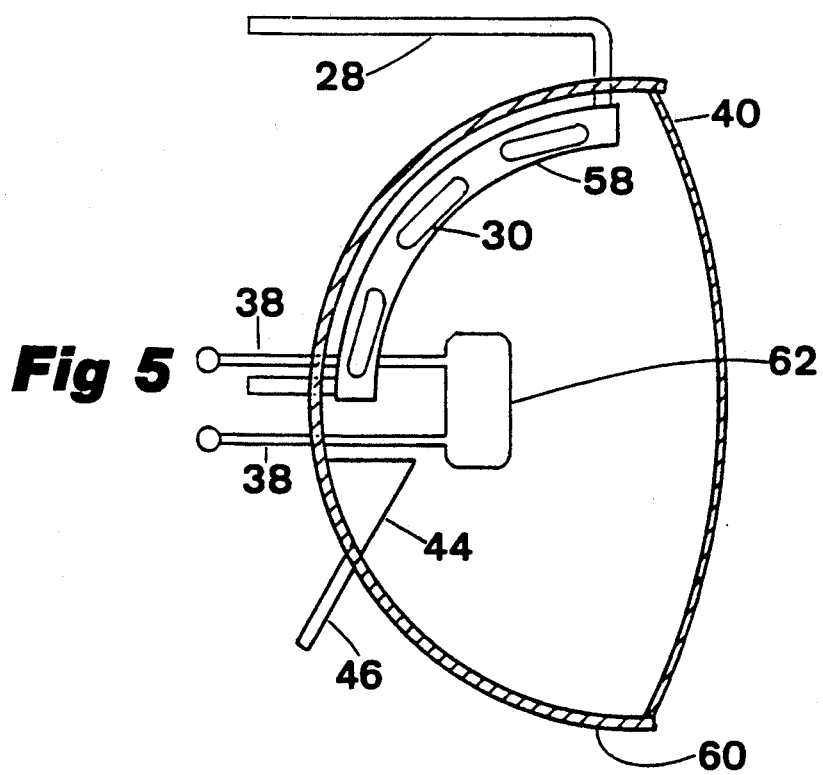

MOISTURE SHEDDING LIQUID COOLED FLOODLIGHT FIXTURE

BACKGROUND

1. Field of the Invention

The present invention relates to a liquid cooled floodlight fixture in which the cooling device is provided with a method of shedding atmospheric moisture which condenses on the cooling device so that condensed moisture is restrained from coming into contact with and damaging moisture vulnerable floodlight fixture components.

2. Description of Prior Art

Heat is a major cause of shortened lamp life, particularly in sodium vapor lamps where heat forces the excess sodium-mercury mixture into the arc tube current raising the voltage across the lamp thereby increasing material decomposition in the lamp which shortens the lamp's working lifespan. Heat radiated by a high wattage lamp also increases the temperature in an enclosed area, such as the area contained in a greenhouse or film studio. A liquid cooled floodlight fixture can collect and transfer radiated lamp heat via the liquid transfer medium to a location external to the areas where ambient temperature conditions are desired. The heated liquid transfer medium can be cooled by a refrigeration device or by an evaporative cooling device and the liquid transfer medium can be recycled back through the floodlight cooling device to reabsorb additional radiated heat. If water is used as a heat transfer medium, the heated water can be expelled down a drain and a continuous supply of fresh water can be introduced into the floodlight cooling apparatus to remove radiated heat from the lamp.

In greenhouses a high relative humidity can exist. The high humidity condition causes water vapor from the atmosphere to condense and form water droplets on the surfaces of the floodlight cooling device. Water droplets can also form and collect between closely spaced heat collecting fins used in some types of cooling devices and can reduce the overall effective heat absorbing surface area of the cooling device. If some area of the cooling device is located in a space directly above a vulnerable electrical component, such as the optimum heat absorbing area directly above a hot gloss envelope of the lamp, water droplets falling on the hot glass envelope of the lamp can fracture the glass envelope and destroy the lamp. Other problems encountered with dripping water inside a floodlight fixture include electrical shorts, mildew, rot and rusting of lamp components.

Other applications for use of a moisture shedding liquid cooled floodlight fixture include farming operations conducted inside space stations, space vehicles and undersea dwellings.

Originally, floodlight fixtures designed to dissipate excess heat radiated by a lamp were intended only to extend the operating life of the lamp. The additional cost of manufacturing many heat dissipating floodlight fixture outweighted the economic advantages of extending the operating life of the lamp. However, in a greenhouse application, liquid cooled light fixtures have multiple advantages. Among the advantages of a liquid cooled light fixture in a greenhouse is the ability to provide a closed, ambient temperature condition that maintains a constant ratio of carbon dioxide to air in a carbon dioxide enriched greenhouse by eliminating the need for air conditioning or excessive ventilation. Other advantages include producing a controlled, closed environment free of insect pests, mold and fungus that can damage greenhouse plants; reducing radiated heat from lamps so that more lamps can be used within a confined area to more closely duplicate the luminosity of the outdoor sunlight; and enabling a greenhouse operator to position a liquid cooled floodlight closer to living greenhouse plants producing greater luminosity at closer light source distances with the same electricity consumption while eliminating the problems of overheating, scorching and drying out the plants. Prior art such as U.S. Pat. No. 4,598,347 issued to Peppers (1986) dissipated electric lamp heat into the immediate surrounding atmosphere which in an enclosed area created the need for ventilation or air conditioning. Prior art that involved encapsulating an electric lamp in a transparent water jacket had the disadvantage of substantially reducing the luminosity of the light fixture as well as creating the possibility of a short circuit if water were to leak into the lamp socket. The liquid cooled light fixture disclosed in U.S. Pat. No. 1,457,646 issued to Wilson (1926), was a metal, water jacketed light fixture which was unsuitable for greenhouse applications because it focused light from a lamp bulb and created a hot spot at the point of focus. The Wilson light fixture was inefficient in that it had a limited surface area for heat absorption, was expensive to manufacture, had poor internal reflectivity, and had no means to shed condensed moisture. Prior art involving a lamp containing within it a means of cooling had the disadvantage of being expensive to manufacture and expensive to replace. The internal lamp cooling surfaces also decreased lamp luminosity. In addition, all liquid cooled floodlight fixtures heretofore known suffer from one or more of a number of disadvantages:

(a) There has been no consideration given to controlling and eliminating condensed water vapor from the atmosphere that condenses on the surfaces of the cooling device creating the problems encountered when moisture comes into contact with various moisture vulnerable components of the floodlight fixture.

(b) Floodlight fixtures heretofore have been designed with cooling devices that restrict light ray divergence because of the physical presence of the cooling device which obstructs the widest possible divergence of light rays.

(c) Cooling devices in floodlight fixtures have been designed in such a way that they reduce the luminosity of the lamp or the luminosity is reduced by physical obstructions to the light emitted by the lamp.

(d) Floodlight fixtures with cooling devices reflect the lamp light in such a way that portions of the light rays become focused creating a hot spot that impinges on plants and burns the plant at that point.

(e) No consideration has been given to the problem of eliminating condensed water retention between heat exchanger cooling fins in a light fixture.

(f) Cooling devices in light fixtures have heretofore been designed to fit a specific floodlight fixture precluding the use of a compact, universal design for the cooling device which can be retrofitted to a wide variety of different floodlight fixtures.

OBJECTS AND ADVANTAGES

Accordingly, besides the objects and advantages of the moisture shedding liquid cooled floodlight described in my above patent, several objects and advantages of the present invention are:

(a) to provide a liquid cooled floodlight fixture which sheds condensed water vapor which collects on the cooling device so that the condensed water is precluded from coming into contact with moisture vulnerable floodlight fixture components;

(b) to provide a moisture shedding liquid cooling device in a floodlight fixture in which the cooling device is designed to maximize light ray divergence from the lamp;

(c) to provide a moisture shedding liquid cooling device in a floodlight fixture in which the cooling apparatus is designed to maximize the luminosity output from the lamp;

(d) to provide a moisture shedding liquid cooling device in a floodlight fixture which eliminates plant damaging focused hot spots from the fixture by using a cooling device designed to maximize light ray dispersion;

(e) to provide a moisture shedding liquid cooling device in a floodlight fixture in which a finned heat exchanger is used as the cooling device and the fins are spaced far enough apart from each other to prevent the build up and retention of moisture between the fins;

(f) to provide a moisture shedding liquid cooling device for floodlight fixtures that is designed to be retrofitted to a diversity of floodlight fixtures.

Further objects and advantages are to provide a moisture shedding liquid cooled floodlight fixture that is inexpensive to manufacture and simple in design. Still further objects and advantages will become apparent from a consideration of the ensuing descriptions and drawings.

DRAWING FIGURES

In the drawings, closely related figures have the same number but different alphabetic suffixes.

FIG. 1 shows a bottom view of various aspects and positions of components in a moisture shedding liquid cooled floodlight fixture, minus drip accumulators and bezel.

FIB. 2a shows a sectional side view of a moisture shedding liquid cooled floodlight fixture with an inverted-V shaped heat exchanger.

FIG. 2b shows a sectional end view of the device shown in FIG. 2a.

FIG. 3b shows the sectional end view of the device shown in FIG. 3a.

FIG. 4 shows a moisture shedding truncated cone shaped light fixture and heat exchanger from a sectional side view.

FIG. 5 shows a moisture shedding horizontally directed liquid cooled light fixture with a heat exchanger in the form of a spherical segment and with a circular shaped drip accumulator.

REFERENCE NUMERALS IN DRAWINGS

Figure 1:
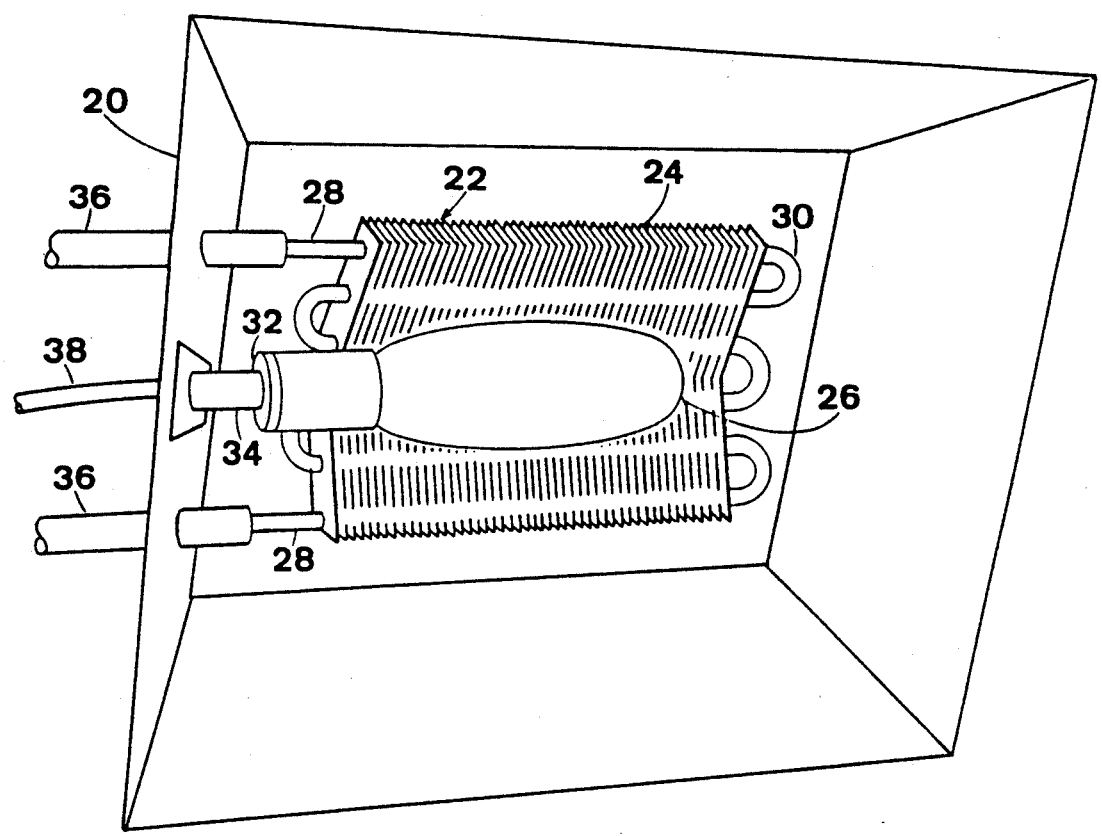

20 Flared box-shaped light housing or luminaire
22 Inverted V shaped heat exchanger assembly
24 Heat exchanger fins
26 Lamp
28 Inlet/outlet fluid nozzles for heat exchanger
30 Heat exchanger tubing
32 Lamp socket
34 Lamp socket support
36 Inlet and outlet tubing to and from fluid reservoir or source and drain
38 Lamp electrical cord
40 Bezel
42 Heat exchanger connector or fastener
44 Drip accumulator
46 Drip accumulator outlet nozzle
48 Flat heat exchanger
50 Drip accumulator connector
52 Circular drip accumulator
54 Truncated cone shaped heat exchanger
56 Truncated cone shaped lamp housing
58 Sperical segment shaped heat exchanger
60 Horizontally directed lamp housing
62 Discharge lamp

DESCRIPTION

FIGS. 1 to 5

Figure 2A:
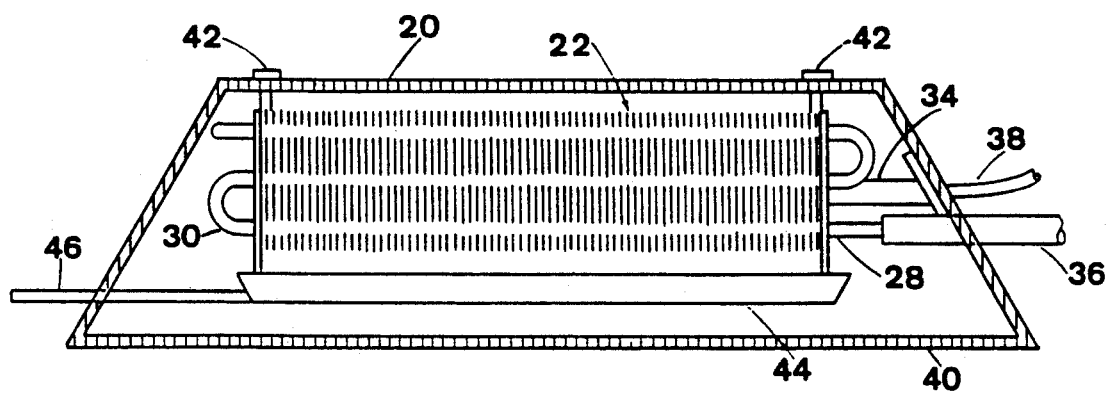
Figure 2B:
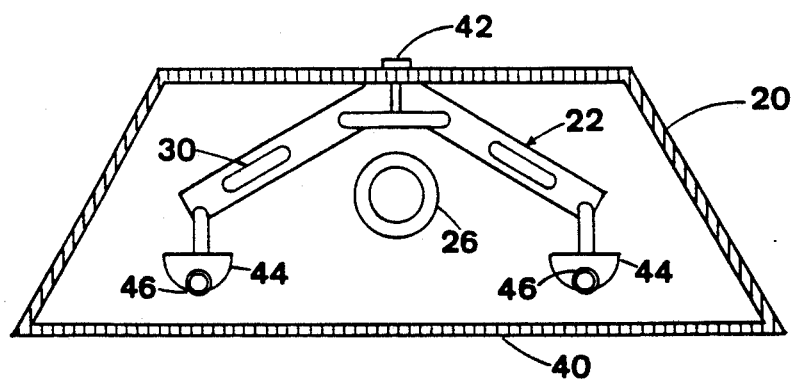

A typical embodiment of the present invention is illustrated in FIG. 1 (bottom view), FIG. 2a (side view) and FIG. 2b (end view). The floodlight fixture housing comprises a thin metal or plastic shell (20) having within the housing a metal finned heat exchanger (22) mounted by screws or some other type of retainer (42). The heat exchanger (22) is mounted between the housing inner surface (20) and the electric lamp or discharge device (26). The lamp (26) is held in place by a lamp socket (32) and the lamp socket (32) is mounted by screws and a metal tubular support (34). Electrical wires (38) are connected to the lamp socket (32) terminal connections and wires supply electrical power to the lamp (26). Inlet (36) and outlet (36) tubes deliver and extract the heat transfer medium, normally a fluid, to and from the heat exchanger (22) when connected to inlet (28) and outlet (28) tubing connectors.

In the preferred embodiment of the invention, shown in FIG. 2a and 2b, the heat exchanger (22) is angled in an inverted-V configuration. Heat exchanger (22) is connected by fastener (42) to floodlight housing (20). Drip accumulators (44) are connected to the lower edges of heat exchanger (22). Discharge nozzles (46) are built into the ends of drip accumulators (44). Lamp (26) is positioned beneath heat exchanger (22) so that heat exchanger (22) occupies the space between lamp (26) and floodlight luminaire (20). A bezel (40) is attached to the bottom opening of the floodlight housing (20). Heat exchanger (22) has polished metal surfaces and fins (24) which form a renticulated pattern when viewed from the edges. The most economical method of manufacturing heat exchanger (22) involves using copper or a copper alloy for heat exchanger tubes (30) and aluminum for fins (26). Other manufacturing materials include heat conducting metals such as stainless steel, etc.

Figure 3A:
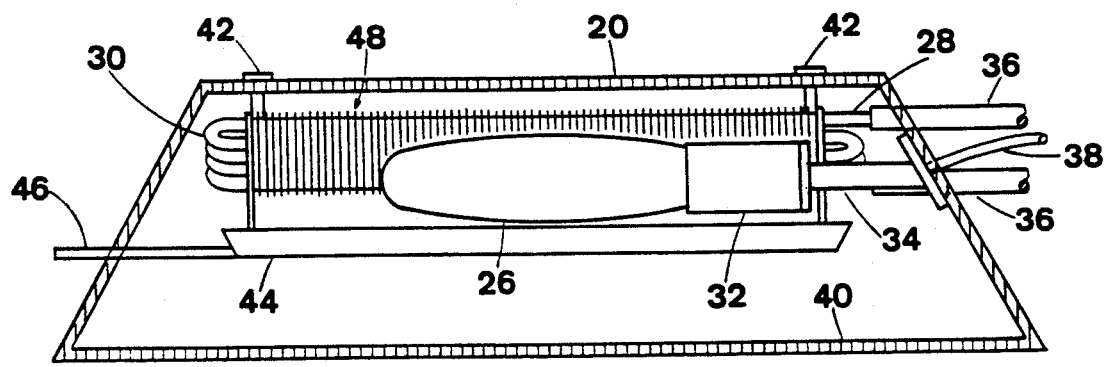
FIG. 3a shows a sectional side view of a moisture shedding liquid cooled floodlight fixture with a flat heat exchanger angled downward from the horizontal.
Figure 3B:
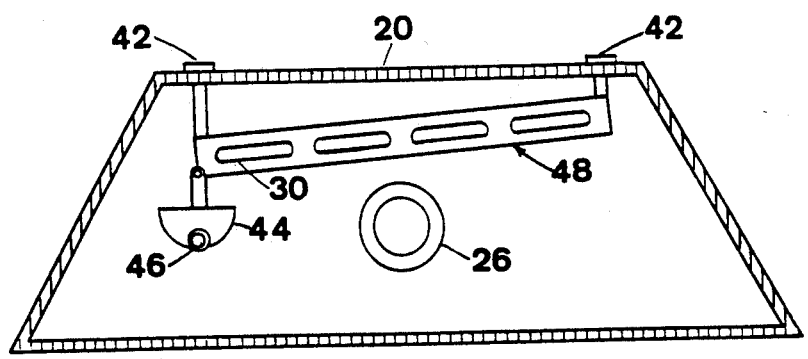

Another embodiment of the invention is shown in FIG. 3a and 3b, where a flat heat exchanger (48) is mounted using screws or some other type of connectors (42) at an angle to the horizontal between lamp (26) and the inner surface of housing (20).

Another embodiment of the invention is illustrated in FIG. 4. A truncated cone shaped housing (56) and a vertically mounted lamp (26) has a heat exchanger (54) in the shape of a truncated cone surrounding the upper portion of lamp (26). A circular drip accumulator (52) is mounted by connectors (50) to the bottom edge of the truncated cone shaped heat exchanger (58).

In FIGS. 1, 2a, 2b, 3a, 3b and 4 the light fixture is shown as reflecting light downward, which is a configuration common in most applications, including greenhouse applications. Another configuration suitable for use in a film studio is shown in FIG. 5. The flood light fixture in FIG. 5 is directed so that light is emitted horizontally or at an angle to the horizontal, and a cup shaped drip accumulator (44) is positioned beneath a spherical segment shaped heat exchanger (58).

Typical embodiments of the invention employ a bezel made of glass or plastic which is connected to the open end of floodlight fixtures (20),(56) and (60). When using a bezel in the liquid cooled floodlight fixtures described herein, the use of a drip accumulator (44) mounted beneath heat exchangers (22),(48),(54) and (58) becomes desirable.

Choices of electric lamps (26) and discharge devices (62) that can be used in the moisture shedding fluid cooled floodlight fixture include high wattage metal halide and mercury vapor lamps, high and low pressure sodium lamps, fluorescent lamps, incandescent lamps, and consumable electrode lamps such as carbon arc lights, et.

The cooling apparatus used in the embodiments described herein is a heat exchanger which is typically constructed of multiple metal fins (24) in close, equally spaced proximity to one another which are retained together by a metal tube or tubes (30) which run perpendicularly through metal fins (26). A fin spacing of less than five equally spaced fins per linear centimeter is preferred. The heat exchanges (22), (48), (54), (58), are preferably mounted in the space available between floodlight fixture housings (20), (56), (60) and lamp (26) or discharge device (62).

There are various possibilities with regard to the relative positions of components named in the above descriptions of embodiments, along with materials used, and shapes of floodlight fixture components. Materials other than metal can be used for the floodlight fixture reflector; since the floodlight fixture is operating at a reduced temperature, a plastic reflector with mylar foil embossed on the reflective side of the reflector can be used. The shape of the floodlight fixture reflector can be that of a truncated cone, box-like, or half-cylinder shaped. The floodlight fixture can contain one or more lamps of the same or different types, and one or more configurations of cooling devices such as refrigerant devices, non-finned heat exchangers, etc., and one or more configurations of condensed water removal systems, such as forced air convection systems employing for example a fan, wicke systems, vacuum suction and removal systems, etc.

From the description above, a number of advantages of my moisture shedding fluid cooled floodlight fixture become evident:

(a) The elimination of moisture that collects on the surfaces of the cooling devices also eliminates the possibility of floodlight fixture components rusting, rotting, mildewing, shorting out and breaking.

(b) The light ray divergence of the floodlight is maintained or maximized.

(c) The luminosity of the floodlight is maintained or maximized.

(d) The focused hot spots normally present in floodlight fixtures are eliminated so that damage to greenhouse plants, fruits and vegetables from focused heat is eliminated.

(e) The moisture that can be retained by a finned heat exchanger between the fins is eliminated so that the full cooling surface area of the heat exchanger is utilized.

(f) The moisture shedding liquid cooled floodlight fixture cooling apparatus herein is a device that can be fitted and retrofitted to a diverse number of existing light fixtures to provide cooling for radiated lamp heat.

OPERATION

FIGS. 1 to 5

In FIGS. 1, 2a and 2b, the inverted V shape of heat exchanger (22) allows condensed water to run down the downward sloping side of heat exchanger (22). The condensed water drips from the outer, lower edges of heat exchanger (22) into drip accumulators (44). Drip accumulators (44) discharge condensed water through outlets (46). Tubing connected to outlets (46) dispense the condensed water to a separate location away from the proximity of the floodlight fixture. The inverted V shape of heat exchanger (22) additionally provides for equal light ray divergence from lamp (26).

In FIGS. 3a and 3b, a flat shaped heat exchanger (48) functions in a manner similar to heat exchanger (22) in that condensed moisture runs down the sloping angle of heat exchanger (48) and can either be allowed to drip straight down from the fixture or the water can be allowed to drip into a single drip accumulator (44) as shown in FIG. 3b. Condensed water is dispensed through nozzle (46) as in FIG. 2a. However, equal light ray divergence is compromised for heat exchanger (48) because of its single angle of slope.

In FIG. 4 the truncated cone shaped heat exchanger (54) surrounding the upper portion of lamp (26) has a circular shaped drip accumulator (52) that collects condensed water that drips off the bottom edges of heat exchanger (54). Condensed water is dispensed through nozzle (46) as in FIG. 2a.

In FIG. 5 the spherical segment shaped heat exchanger (58) positioned above discharge lamp (62) has a cup-like drip accumulator which collects and dispenses condensed moisture that drips off the bottom edge of heat exchanger (58). Moisture is discharged through nozzle (46) as in FIG. 2a.

A bezel (40) connected to the open end of housings (20), (56), and (60) increases the efficiency of the fixture to disperse light and thereby avoid hot spots that can damage plants and vegetables. With bezel (40) heat is retained within the floodlight fixture so that heat exchangers (22), (48), (54) and (58) have more time to absorb heat radiated by lamp (26) or discharge device (62) before the heat escapes into the atmosphere.

In FIGS. 1 to 5, and in heat exchangers (22), (48), (54) and (58), metal tubes (30) conduct the heat transfer medium or fluid which absorbs heat from the metal fins (24) which absorb heat radiated to the atmosphere from lamp (26) and discharge device (62). The heat transfer medium can be water, a combination of water and a heat absorbing material such as ethylene glycol, or it can be a refrigerant fluid. A heat transfer medium comprising a refrigerant, water or a water mixture can be cooled in an area away from the proximity of the area where an ambient temperature condition is desired, and can be recycled to conserve water or fluid. Heat exchangers (22), (48), (54), and (58) are most efficient when they are mounted in the space available between housing (20), (56) and (60), and lamp (26) and discharge device (62), where radiated heat from lamp (26) and discharge device (62) rises and concentrates. Additionally advantages are obtained from the described position of heat exchanger due to the renticulated pattern created by fins (24) dispersing reflected light which eliminates focused hot spots. Dispersed light is also less likely to reflect back into lamp (26) which would increase filament or electrode heat and decrease the lamp's lifespan. A highly polished metal surface for heat exchanger (22), (48), (54), and (58) is preferred in order to optimize light reflection within the reflective housings.

SUMMARY, RAMIFICATIONS AND SCOPE

Accordingly, the reader will see that the moisture shedding liquid cooled floodlight fixture economically advances the state of the art and capabilities available to greenhouse and indoor growers of plants, fruits and vegetables. Further, the invention herein eliminates problems associated with radiated heat from lights in other enclosed areas such as in film studios, space stations, space vessels and underwater growing operations. The moisture shedding liquid cooled floodlight fixture has additional advantages in that:

- it permits the use of an internal cooling device which eliminates condensed moisture that collects on the cooling device and precludes the possibility of moisture damage occurring to the floodlight fixture;
- it permits maximum light ray divergence in a moisture shedding liquid cooled floodlight fixture;
- it permits maximum luminosity output from a moisture shedding liquid cooled floodlight fixture;
- it permits maximum light ray dispersion from a moisture shedding liquid cooled light fixture to eliminate focused hot spots which could damage greenhouse plants;
- it permits the use of a cooling device in a moisture shedding liquid cooled floodlight fixture that prevents the retention of condensed water between heat exchanger cooling fins;
- it permits a compact, liquid cooled moisture shedding cooling device for a floodlight fixture that can be retrofitted to a diversity of floodlight fixtures to provide for cooling radiated lamp light.

Although the description above contains many specificities, these should not be construed as limiting the scope of the invention, but as merely providing illustrations of some of the preferred embodiments of this invention.

Thus, the scope of the invention should be determined by the appended claims and their legal equivalents, rather than by the examples given.

I claim:

1. In combination, a high intensity lamp and luminaire assembly comprising,
    (a) a lamp heat removal means comprising a heat exchanger with multiple metal fins and at least one metal tube running through said fins, and a heat transfer medium circulating in said at least one tube,
    (b) wherein the heat exchanger is mounted at a point of highest heat concentration between said high intensity lamp and a reflective surface of said luminaire,
    (c) a light ray dispersion means wherein the heat exchanger fins are arranged so as to minimize light ray convergence back onto a light source within said high intensity lamp,
    (d) a condensate removal means wherein the heat exchanger is positioned to create a gravity fed drip path which directs condensate forming on the heat exchanger to a location separate from that of water vulnerable lamp components.

2. A lamp assembly as claimed in claim 1 wherein said light source is a filament.

3. A lamp assembly as claimed in claim 1 wherein said light source is a discharge electrode.

4. A lamp assembly as claimed in claim 1 wherein the heat exchanger comprises an inverted V shape to provide a gravity fed drip path that transfers condensate to lower edges of said inverted V shaped heat exchanger where the condensate drips off the heat exchanger into a desired location.

5. A lamp assembly as claimed in claim 4 wherein the heat exchanger comprises a flat shaped device that is mounted at a downward sloping angle from horizontal to provide a gravity fed drip path allowing the condensate to drip off the heat exchanger into a desired location.

6. A lamp assembly in claim 4 which incorporates drip pans mounted below bottom edges of the heat exchanger to trap and redirect condensate to a separate desired location.

7. A lamp assembly as claimed in claim 4 wherein the metal fins are comprised of aluminum or an aluminum alloy and said tube or tubes are comprised of copper or a copper alloy.

8. A lamp assembly as claimed in claim 4 wherein the heat exchanger fins are spaced apart five or fewer fins per linear centimeter.

* * * * *